US012519124B2

(12) United States Patent
Jung et al.

(10) Patent No.: US 12,519,124 B2
(45) Date of Patent: Jan. 6, 2026

(54) UNIT CELL PREPARATION APPARATUS AND METHOD

(71) Applicant: LG Energy Solution, Ltd., Seoul (KR)

(72) Inventors: Tai Jin Jung, Daejeon (KR); Su Taek Jung, Daejeon (KR); Soon Kwan Kwon, Daejeon (KR); Sang Ho Bae, Daejeon (KR); Seong Won Choi, Daejeon (KR); Yong Jun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 309 days.

(21) Appl. No.: 17/912,734

(22) PCT Filed: Mar. 25, 2021

(86) PCT No.: PCT/KR2021/003726
§ 371 (c)(1),
(2) Date: Sep. 19, 2022

(87) PCT Pub. No.: WO2021/194284
PCT Pub. Date: Sep. 30, 2021

(65) Prior Publication Data
US 2023/0126524 A1 Apr. 27, 2023

(30) Foreign Application Priority Data
Mar. 25, 2020 (KR) ........................ 10-2020-0036395

(51) Int. Cl.
*H01M 10/04* (2006.01)
(52) U.S. Cl.
CPC .............................. *H01M 10/0404* (2013.01)
(58) Field of Classification Search
CPC .... H01M 10/0404; H01M 50/46; B65H 39/00
See application file for complete search history.

(56) References Cited

U.S. PATENT DOCUMENTS 4,064,288 A 12/1977 Shah et al.
2001/0049872 A1* 12/2001 Hong .................... H01M 50/46
429/94

(Continued)

FOREIGN PATENT DOCUMENTS

CN 205790205 U 12/2016
CN 110121810 A 8/2019
(Continued)

OTHER PUBLICATIONS

Extended European Search Report including Written Opinion for Application No. 21775514.9 dated Aug. 4, 2023, pp. 1-8.

(Continued)

*Primary Examiner* — George R Koch
(74) *Attorney, Agent, or Firm* — Lerner David LLP

(57) ABSTRACT

An apparatus for preparing a unit cell is provided. The apparatus includes a lower separator reel from which a lower separator sheet is unwound, a first nozzle configured to apply an adhesive to at least a portion of one surface facing upward of the unwound lower separator sheet, an upper separator reel from which an upper separator sheet is unwound, a second nozzle configured to apply an adhesive to at least a portion of one surface facing upward of the unwound upper separator sheet, and a first nip roll configured to turn opposite surfaces of the upper separator sheet upside down so that the one surface of the upper separator sheet to which the adhesive has been applied is directed downward and adheres to an upper surface of a first electrode stably placed on the one surface of the lower separator sheet.

20 Claims, 6 Drawing Sheets

(56) References Cited

U.S. PATENT DOCUMENTS

| | | | |
|---|---|---|---|
| 2004/0154160 A1 | 8/2004 | Hong | |
| 2008/0008923 A1 | 1/2008 | Numao | |
| 2010/0132308 A1 | 6/2010 | Kadowaki et al. | |
| 2018/0034028 A1 | 2/2018 | Jung et al. | |
| 2019/0363389 A1 | 11/2019 | Ko et al. | |
| 2020/0014062 A1* | 1/2020 | Kaga | H01M 50/124 |
| 2020/0067051 A1 | 2/2020 | Yamashita et al. | |
| 2022/0200038 A1 | 6/2022 | Bae et al. | |
| 2023/0109577 A1 | 4/2023 | Ko et al. | |

FOREIGN PATENT DOCUMENTS

| | | | | |
|---|---|---|---|---|
| CN | 110352521 A | | 10/2019 | |
| CN | 110690368 A | | 1/2020 | |
| EP | 3588653 A1 | | 1/2020 | |
| EP | 3951972 A1 | | 2/2022 | |
| JP | 3584400 B2 | | 11/2004 | |
| JP | 4882221 B2 | | 2/2012 | |
| JP | 2012074402 A | * | 4/2012 | |
| JP | 2012160352 A | * | 8/2012 | |
| JP | 5291811 B2 | | 9/2013 | |
| JP | 2015197977 A | | 11/2015 | |
| JP | 2019135699 A | | 8/2019 | |
| KR | 100363270 B1 | | 11/2002 | |
| KR | 100388648 B1 | | 6/2003 | |
| KR | 20100016619 A | | 2/2010 | |
| KR | 20160133276 A | | 11/2016 | |
| KR | 20170027677 A | | 3/2017 | |
| KR | 20170111692 A | | 10/2017 | |
| KR | 20190045602 A | | 5/2019 | |
| KR | 20190113907 A | | 10/2019 | |
| WO | WO-2018154777 A1 | * | 8/2018 | H01M 10/0404 |

OTHER PUBLICATIONS

International Search Report for Application No. PCT/KR2021/003726 mailed Jul. 16, 2021, pp. 1-2.

* cited by examiner

UNIT CELL PREPARATION APPARATUS AND METHOD

CROSS-REFERENCE TO RELATED APPLICATIONS

This application is a national stage entry under 35 U.S.C. § 371 of International Application No. PCT/KR2021/003726 filed on Mar. 25, 2021, which claims priority from Korean Patent Application No. 10-2020-0036395, filed on Mar. 25, 2020, the disclosures of which are incorporated by reference herein.

TECHNICAL FIELD

The present invention relates to unit cell preparation apparatus and method, and more particularly, to unit cell preparation apparatus and method which may prevent a displacement of an electrode from its original position when the electrode and separator sheets are stacked to form a unit cell.

BACKGROUND ART

In general, types of secondary batteries include a nickel cadmium battery, a nickel hydride battery, a lithium ion battery, and a lithium ion polymer battery. These secondary batteries are not only applied and used in small products such as digital cameras, P-DVDs, MP3Ps, mobile phones, PDAs, portable game devices, power tools, and E-bikes, but are also applied and used in large products requiring high output, such as electric vehicles and hybrid vehicles, and a power storage device and a power storage device for backup which store surplus generated power or renewable energy.

In order to prepare such a secondary battery, first, a positive electrode collector and a negative electrode collector are respectively coated with electrode active material slurries to prepare a positive electrode and a negative electrode, and the positive electrode and the negative electrode are then stacked on both sides of a separator to form an electrode assembly having a predetermined shape. Then, after the electrode assembly is accommodated in a battery case and an electrolyte solution is injected, the battery case is sealed.

The electrode assembly is classified into various types. For example, there are a simple stack type in which a unit cell is not prepared and positive electrodes, separators, and negative electrodes are simply crossed and continuously stacked, a lamination & stack type (L&S) in which a unit cell is first prepared using a positive electrode, a separator, and a negative electrode and these unit cells are then stacked, a stack & folding type (S&F) in which a plurality of electrodes or unit cells are spaced apart and attached to one surface of a separator sheet having a greater length in one side and the separator sheet is repeatedly folded in the same direction from one end, and a Z-folding type that alternatingly repeats a process in which a plurality of electrodes or unit cells are alternatingly attached to one surface and the other surface of a separator sheet having a greater length in one side and the separator sheet is folded in a specific direction from one end and then folded in an opposite direction.

Among them, in order to prepare the lamination & stack type (L&S), stack & folding type, or Z-folding type electrode assembly, first, a unit cell may be prepared. In general, in order to prepare the unit cell, separators are respectively stacked on upper and lower surfaces of a center electrode while the center electrode is moved to one side by a conveyor belt or the like, and thereafter, an upper electrode is further stacked on an uppermost end. In addition, in some cases, a lower electrode may be further stacked on a lowermost end. Then, a laminating process is performed in which heat and pressure are applied to a stack in which the electrodes and the separators are stacked. Since the laminating process is performed, the electrodes and the separators may be adhered to each other to firmly form a unit cell.

However, typically, the electrode and the separator were not adhered to each other, but were only in contact with each other until the laminating process was performed on the stack in which the electrode and the separator were stacked. Thus, there was a problem in that the electrode was out of position in a process of transferring the stack to perform the laminating process. Also, since the laminating process applies high heat and pressure to the stack, there may be a problem in that the electrode was damaged. Furthermore, recently, a separator capable of adhering to the electrode even with low heat and pressure has been developed, but such a separator also had a problem in that process efficiency was reduced while it was not economical due to excessively high manufacturing costs.

PRIOR ART DOCUMENTS

Korean Patent Application Laid-Open Publication No. 2010-0016619

DISCLOSURE OF THE INVENTION

Technical Problem

An aspect of the present invention provides unit cell preparation apparatus and method which may prevent a displacement of an electrode from its original position when the electrode and separator sheets are stacked to form a unit cell.

The object of the present invention is not limited to the aforesaid, but other objects not described herein will be clearly understood by those skilled in the art from descriptions below.

Technical Solution

According to an aspect of the present invention, there is provided an apparatus for preparing a unit cell which includes: a lower separator reel from which a lower separator sheet is unwound; a first nozzle for applying an adhesive to at least a portion of one surface facing upward of the unwound lower separator sheet; an upper separator reel from which an upper separator sheet is unwound; a second nozzle for applying an adhesive to at least a portion of one surface facing upward of the unwound upper separator sheet; and a first nip roll for turning opposite surfaces of the upper separator sheet upside down so that the one surface of the upper separator sheet to which the adhesive has been applied is directed downward and adheres to an upper surface of a first electrode stably placed on the one surface of the lower separator sheet.

Also, the apparatus for preparing a unit cell may further include a first header which stably places the first electrode on the one surface of the lower separator sheet to which the adhesive has been applied.

Furthermore, the apparatus for preparing a unit cell may further include a first electrode reel from which a first electrode sheet, which is to be the first electrode, is unwound.

Also, the apparatus for preparing a unit cell may further include a first vision sensor disposed above the first electrode to photograph the first electrode, before the first electrode adheres to the upper separator sheet.

Furthermore, the first nip rolls may be respectively disposed on opposite surfaces of a first stack, which is formed by sequentially stacking the lower separator sheet, the first electrode, and the upper separator sheet, to apply pressure to the first stack while rotating.

Also, the apparatus for preparing a unit cell may further include a third nozzle which applies an adhesive to at least a portion of the other surface facing upward of the upper separator sheet.

Furthermore, the apparatus for preparing a unit cell may further include second nip rolls respectively disposed on opposite surfaces of a second stack, which is formed by sequentially stacking the lower separator sheet, the first electrode, the upper separator sheet, and a second electrode, to apply pressure to the second stack while rotating, when the second electrode is stably placed on the other surface of the upper separator sheet to which the adhesive has been applied.

Also, the apparatus for preparing a unit cell may further include a second header which stably places the second electrode on the other surface of the upper separator sheet to which the adhesive has been applied.

Furthermore, the apparatus for preparing a unit cell may further include a second electrode reel from which a second electrode sheet, which is to be the second electrode, is unwound.

Also, the apparatus for preparing a unit cell may further include a second vision sensor disposed above the second electrode to photograph the second electrode, before the second electrode is stably placed on the other surface of the upper separator sheet.

Furthermore, the apparatus for preparing a unit cell may further include a cutter for cutting the second stack at a predetermined interval.

Also, the apparatus for preparing a unit cell may further include a third vision sensor disposed on a side of the first electrode to photograph the first electrode, when the first electrode adheres to the upper separator sheet.

Furthermore, the apparatus for preparing a unit cell may further include a light source disposed above the upper separator sheet to radiate light toward the upper separator sheet, when the first electrode adheres to the upper separator sheet.

According to another aspect of the present invention, there is provided a method of preparing a unit cell which includes: unwinding a lower separator sheet from a lower separator reel; applying an adhesive by a first nozzle to at least a portion of one surface facing upward of the unwound lower separator sheet; stably placing a first electrode on the one surface of the lower separator sheet to which the adhesive has been applied; unwinding an upper separator sheet from an upper separator reel; applying an adhesive by a second nozzle to at least a portion of one surface facing upward of the unwound upper separator sheet; and turning opposite surfaces of the upper separator sheet upside down by a first nip roll so that the one surface of the upper separator sheet to which the adhesive has been applied is directed downward and adheres to an upper surface of the first electrode stably placed on the one surface of the lower separator sheet.

Also, in the turning of the opposite surfaces of the upper separator sheet upside down, the first nip rolls may be respectively disposed on opposite surfaces of a first stack, which is formed by sequentially stacking the lower separator sheet, the first electrode, and the upper separator sheet, to apply pressure to the first stack while rotating.

Furthermore, the method may further include applying an adhesive by a third nozzle to at least a portion of the other surface facing upward of the upper separator sheet, after the turning of the opposite surfaces of the upper separator sheet upside down.

Also, the method may further include stably placing a second electrode on the other surface of the upper separator sheet to which the adhesive has been applied, after the applying of the adhesive by the third nozzle.

Furthermore, the method may further include respectively disposing second nip rolls on opposite surfaces of a second stack, which is formed by sequentially stacking the lower separator sheet, the first electrode, the upper separator sheet, and the second electrode, to apply pressure to the second stack while rotating, after the stably placing of the second electrode.

Also, the method may further include cutting the second stack at a predetermined interval by a cutter, after the applying of the pressure to the second stack.

Other specific details of the present invention are included in the detailed description and drawings.

Advantageous Effects

According to the embodiments of the present invention, at least the following effects may be achieved.

When an electrode and separator sheets are stacked to prepare a unit cell, a displacement in position of the electrode may be prevented by applying an adhesive in advance whenever the electrode is stably placed on the separator sheet, even if an expensive separator is not used.

Also, since there is no need to perform a laminating process, a laminator may be removed, and thus, a volume of an apparatus for preparing a unit cell may be reduced and a preparation process may be simplified.

The effects according to the present invention are not limited to the contents as exemplified above, but more various effects are included in the specification.

DETAILED DESCRIPTION

Figure 1:
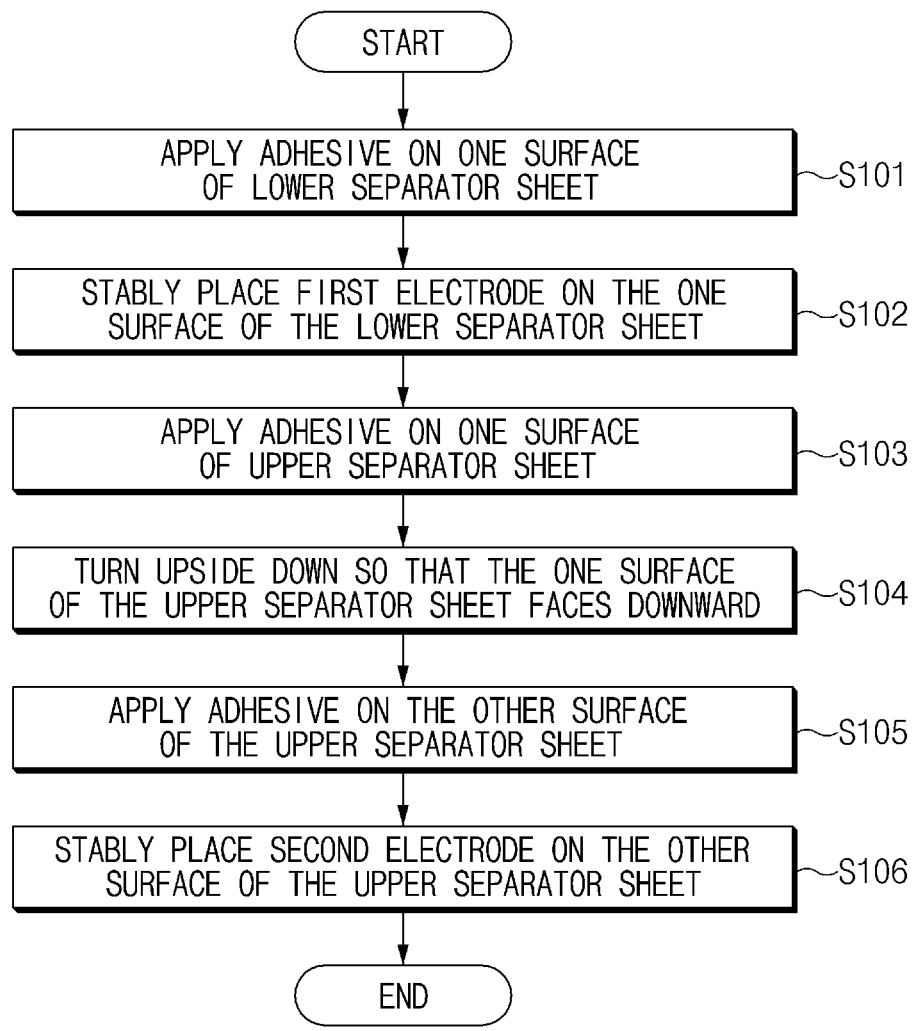
FIG. 1 is a flowchart of a method of preparing a unit cell according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless defined otherwise, all terms (including technical and scientific terms) used herein may be intended to have meanings understood by those skilled in the art. In addition, terms defined in general dictionaries should not be interpreted abnormally or exaggeratedly, unless clearly specifically defined.

The terminology used herein is for the purpose of describing particular example embodiments only and is not intended to be limiting of the present invention. In the specification, the terms of a singular form may include plural forms unless referred to the contrary. It will be further understood that the terms "comprises" and/or "comprising" when used in this specification, specify the presence of stated components, but do not preclude the presence or addition of one or more other components.

Hereinafter, preferred embodiments of the present invention will be described in detail with reference to the accompanying drawings.

FIG. 1 is a flowchart of a method of preparing a unit cell according to an embodiment of the present invention.

According to an embodiment of the present invention, when an electrode 11 and separator sheets 1211 and 1221 are stacked to prepare a unit cell 2, a displacement in position of the electrode 11 may be prevented by applying an adhesive in advance whenever the electrode 11 is stably placed on the separator sheets 1211 and 1221, even if an expensive separator is not used. Also, since there is no need to perform a laminating process, a laminator may be removed, and thus, a volume of an apparatus 1 for preparing a unit cell may be reduced and a preparation process may be simplified.

For this purpose, the method of preparing a unit cell according to the embodiment of the present invention includes the steps of: unwinding a lower separator sheet 1211 from a lower separator reel 121; applying an adhesive by a first nozzle 131 to at least a portion of one surface 1212 facing upward of the unwound lower separator sheet 1211; stably placing a first electrode 1112 on the one surface 1212 of the lower separator sheet 1211 to which the adhesive has been applied; unwinding an upper separator sheet 1221 from an upper separator reel 122; applying an adhesive by a second nozzle 132 to at least a portion of one surface 1222 facing upward of the unwound upper separator sheet 1221; and turning opposite surfaces of the upper separator sheet 1221 upside down by a first nip roll 161 so that the one surface 1222 of the upper separator sheet 1221 to which the adhesive has been applied is directed downward and adheres to an upper surface of the first electrode 1112 stably placed on the one surface 1212 of the lower separator sheet 1211.

Also, after the turning of the opposite surfaces of the upper separator sheet 1221 upside down, the method may further include the steps of: applying an adhesive by a third nozzle 133 to at least a portion of the other surface 1223 facing upward of the upper separator sheet 1221; and stably placing a second electrode 1122 on the other surface 1223 of the upper separator sheet 1221 to which the adhesive has been applied.

Hereinafter, each step illustrated in the flowchart of FIG. 1 will be described in detail with reference to FIGS. 2 to 6.

Figure 2:
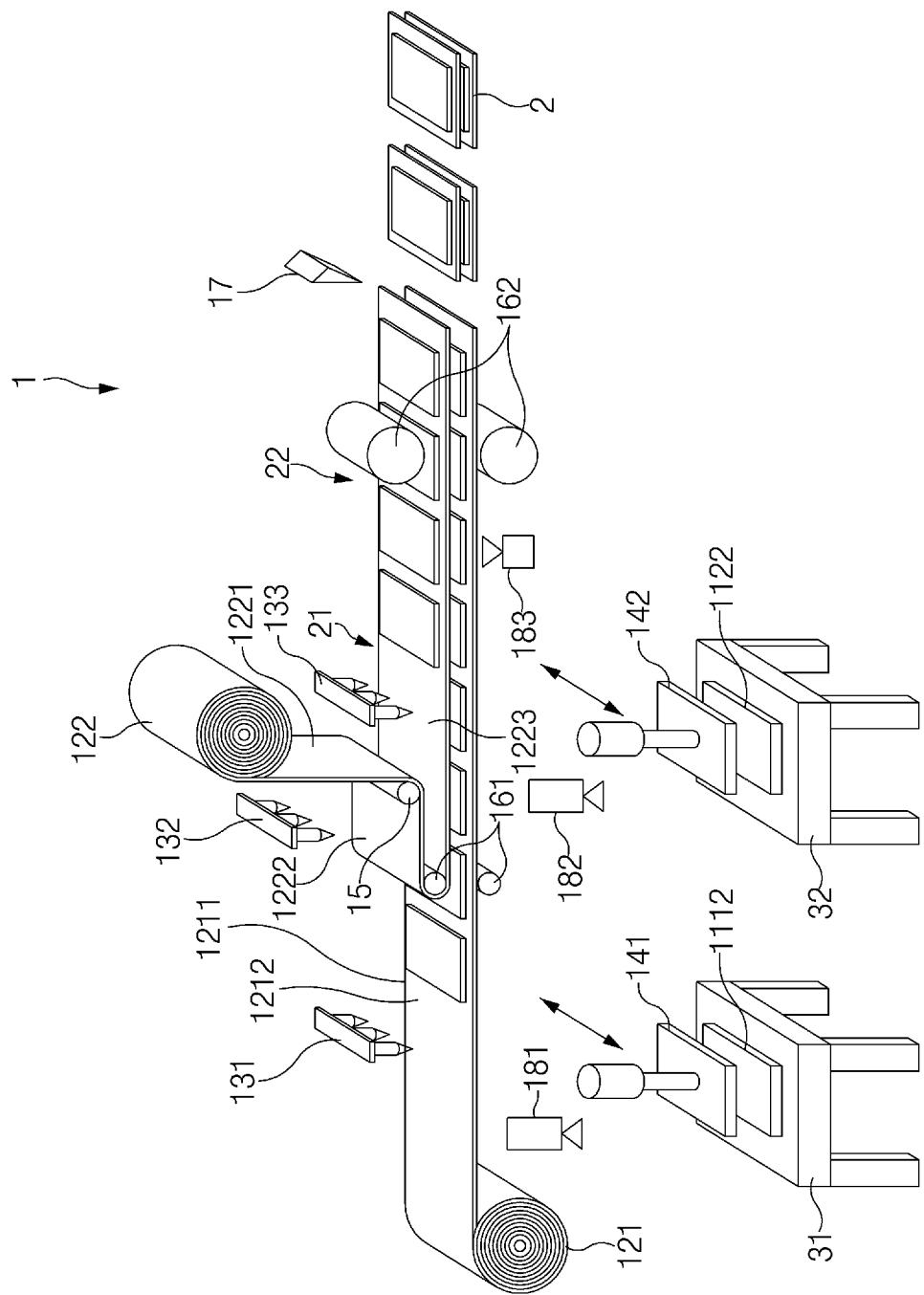
FIG. 2 is a schematic view of an apparatus for preparing a unit cell according to an embodiment of the present invention.

FIG. 2 is a schematic view of the apparatus 1 for preparing a unit cell according to an embodiment of the present invention.

As illustrated in FIG. 2, the apparatus 1 for preparing a unit cell according to the embodiment of the present invention may include a lower separator reel 121 from which a lower separator sheet 1211 is unwound; a first nozzle 131 for applying an adhesive to at least a portion of one surface 1212 facing upward of the unwound lower separator sheet 1211; an upper separator reel 122 from which an upper separator sheet 1221 is unwound; a second nozzle 132 for applying an adhesive to at least a portion of one surface 1222 facing upward of the unwound upper separator sheet 1221; and a first nip roll 161 for turning opposite surfaces of the upper separator sheet 1221 upside down so that the one surface 1222 of the upper separator sheet 1221 to which the adhesive has been applied is directed downward and adheres to an upper surface of the first electrode 1112 stably placed on the one surface 1212 of the lower separator sheet 1211.

The lower separator reel 121 is a reel on which the lower separator sheet 1211 is wound, and the lower separator sheet 1211 is unwound from the lower separator reel 121. In addition, the upper separator reel 122 is a reel on which the upper separator sheet 1221 is wound, and the upper separator sheet 1221 is unwound from the upper separator reel 122. The first electrode 1112 is stably placed on the one surface 1212 facing upward of the lower separator sheet 1211 unwound from the lower separator reel 121, and the upper separator sheet 1221 unwound from the upper separator reel 122 is stacked on the upper surface of the first electrode 1112. As a result, a first stack 21 is formed in which the lower separator sheet 1211, the first electrode 1112, and the upper separator sheet 1221 are sequentially stacked. The first stack 21 may be formed by stacking a plurality of first electrodes 1112 on the separator sheets 1211 and 1221 while being spaced apart from each other in a row in a longitudinal direction of the separator sheets 1211 and 1221 and disposed.

Transfer directions of the lower separator sheet 1211 and the upper separator sheet 1221 may be different from each other. For example, as illustrated in FIG. 2, the lower separator sheet 1211 may be unwound and transferred from one side of the apparatus 1 for preparing a unit cell to the other side thereof, and the upper separator sheet 1221 may be unwound and transferred from upper side to lower side. Later, when the adhesive is applied to the one surface 1222 of the upper separator sheet 1221, the transfer direction of the upper separator sheet 1221 may be changed to be the same as the transfer direction of the lower separator sheet 1211 while the opposite surfaces of the upper separator sheet 1221 are turned upside down. However, the present invention is not limited thereto, and the transfer directions of the lower separator sheet 1211 and the upper separator sheet 1221 may be the same from the beginning. In this case, even if the opposite surfaces of the upper separator sheet 1221 are later turned upside down, the transfer direction of the upper separator sheet 1221 may not be changed.

The nozzle 13 applies an adhesive to the separator sheets 1211 and 1221. It is desirable that the adhesive is uniformly applied to surfaces 1212, 1222, and 1223 facing upward of the separator sheets 1211 and 1221. Furthermore, in a case in which viscosity of the adhesive is relatively high, the adhesive may be applied to entire surfaces of the surfaces 1212, 1222, and 1223 of the separator sheets 1211 and 1221. However, in a case in which the viscosity of the adhesive is relatively low, if the adhesive is applied to the entire surfaces of the surfaces 1212, 1222, and 1223 of the separator sheets 1211 and 1221, an amount of the adhesive applied may be excessively large. Accordingly, the adhesive may flow to the outside of the separator sheets 1211 and 1221 to contaminate other parts, and a function of generating power may not be smooth when a secondary battery is prepared. Thus, the adhesive may be applied to upper surfaces of regions of the separator sheets 1211 and 1221 by a spot application method of applying the adhesive in the form of a dot or a line application method of applying the adhesive in the form of a line.

In contrast, if the amount of the adhesive applied is excessively small, the electrode 11 is still not fixed to the separator sheets 1211 and 1221 while the cell is moved, and the electrode 11 may be out of position. Thus, it is desirable that a spacing between regions to which the adhesive is applied is not excessively large.

The adhesive must maintain adhesiveness even if a separator is impregnated with an electrolyte solution. Thus, it is desirable that the adhesive has a property of corrosion resistance that is not modified by chemical causes. Such an adhesive is a hot melt adhesive, wherein the adhesive may include a modified olefin-based thermoplastic resin.

The nozzle 13 includes the first nozzle 131 for applying an adhesive to at least a portion of the one surface 1212 facing upward of the unwound lower separator sheet 1211; the second nozzle 132 for applying an adhesive to at least a portion of the one surface 1222 facing upward of the unwound upper separator sheet 1221; and the third nozzle 133 for applying an adhesive to at least a portion of the other surface 1223 facing upward of the upper separator sheet 1221. Specifically, the first nozzle 131 is disposed above the lower separator sheet 1211 and applies the adhesive to at least a portion of the one surface 1212 facing upward. In addition, the second nozzle 132 is disposed above the upper separator sheet 1221 and applies the adhesive to at least a portion of the one surface 1222 facing upward. When the opposite surfaces of the upper separator sheet 1221 are later turned upside down so that the other surface 1223 of the upper separator sheet 1221 faces upward, the third nozzle 133 is disposed above the upper separator sheet 1221 to apply the adhesive to at least a portion of the other surface 1223 facing upward.

The first electrode 1112 and the second electrode 1122 may be prepared by coating a slurry of an electrode active material, a conductive agent, and a binder on an electrode collector, drying, and then pressing the coated electrode collector. According to an embodiment of the present invention, the first electrode 1112 and the second electrode 1122 may be prepared in a separate process of preparing the electrode 11. The first electrode 1112 may be supplied to a first electrode table 31 or first electrode magazine (not shown) provided on one side of the apparatus 1 for preparing a unit cell, and the second electrode 1122 may also be supplied to a second electrode table 32 or second electrode magazine (not shown) provided on one side of the apparatus 1 for preparing a unit cell. When the first nozzle 131 applies the adhesive to the one surface 1212 of the lower separator sheet 1211, a first header 141 may adsorb the first electrode 1112 and may then transfer the first electrode 1112 to stably place the first electrode 1112 on the one surface 1212 of the lower separator sheet 1211 to which the adhesive has been applied. Later, when the opposite surfaces of the upper separator sheet 1221 are turned upside down and the third nozzle 133 applies the adhesive to the other surface 1223 of the upper separator sheet 1221, a second header 142 may adsorb the second electrode 1122 and may then transfer the second electrode 1122 to stably place the second electrode 1122 on the other surface 1223 of the upper separator sheet 1221 to which the adhesive has been applied. Herein, the first electrode 1112 and the second electrode 1122 may be the electrodes 11 having different polarities. That is, if the first electrode 1112 is a positive electrode, the second electrode 1122 may be a negative electrode, and, if the first electrode 1112 is a negative electrode, the second electrode 1122 may be a positive electrode.

A guide roll 15 guides the one surface 1222 of the upper separator sheet 1221 to face upward when the upper separator sheet 1221 is unwound and transferred. As described above, the transfer directions of the upper separator sheet 1221 and the lower separator sheet 1211 may be different from each other, and, particularly, the upper separator sheet 1221 may be unwound and transferred from the upper side to the lower side. Then, the one surface 1222 of the upper separator sheet 1221 does not face upward, or even if the one surface 1222 of the upper separator sheet 1221 faces upward, it may be inclined with a slope. Thus, in order for the second nozzle 132 to easily apply the adhesive to the one surface 1222 of the upper separator sheet 1221, the guide roll 15 may change the transfer direction so that the one surface 1222 of the upper separator sheet 1221 is horizontal and faces upward.

The first nip roll 161 turns the opposite surfaces of the upper separator sheet 1221 upside down so that the one surface 1222 of the upper separator sheet 1221 to which the adhesive has been applied is directed downward and adheres to the upper surface of the first electrode 1112 stably placed on the one surface 1212 of the lower separator sheet 1211. When the one surface 1222 of the upper separator sheet 1221 is horizontal and directed upward by the guide roll 15, the second nozzle 132 applies the adhesive to the one surface 1222 of the upper separator sheet 1221. Then, the one surface 1222 of the upper separator sheet 1221 must adhere to the upper surface of the first electrode 1112 located below. For this purpose, the one surface 1222 of the upper separator sheet 1221 facing upward must be turned upside down so as to face downward. Thus, the first nip roll 161 rotates in contact with the other surface 1223 of the upper separator sheet 1221, and guides the other surface 1223 of the upper separator sheet 1221 to face upward. Accordingly, the opposite surfaces of the upper separator sheet 1221 are turned upside down, and the one surface 1222 of the upper separator sheet 1221 may adhere to the upper surface of the first electrode 1112.

When the guide roll 15 guides the one surface 1222 of the upper separator sheet 1221 to face upward, as illustrated in FIG. 2, the transfer direction of the upper separator sheet 1221 may be opposite to that of the lower separator sheet 1211. Then, the first nip roll 161 may reverse the transfer direction of the upper separator sheet 1221 while turning the opposite surfaces of the upper separator sheet 1221 upside down. Accordingly, the transfer direction of the upper separator sheet 1221 may be the same as that of the lower separator sheet 1211. However, the present invention is not limited thereto, and, if the transfer directions of the lower separator sheet 1211 and the upper separator sheet 1221 are the same from the beginning, the first nip roll 161 may turn only the opposite surfaces of the upper separator sheet 1221 upside down without changing the transfer direction of the upper separator sheet 1221.

A plurality of first nip rolls 161 may be formed and disposed on opposite surfaces of the first stack 21, in which the lower separator sheet 1211, the first electrode 1112, and the upper separator sheet 1221 are sequentially stacked, respectively. In addition, the first nip roll 161 may apply pressure to the first stack 21 while rotating. Accordingly, the inside of the first stack 21 may be adhered more strongly.

When the opposite surfaces of the upper separator sheet 1221 are turned upside down, the other surface 1223 of the upper separator sheet 1221 faces upward. Then, the third nozzle 133 applies an adhesive to at least a portion of the other surface 1223 facing upward. The second header 142 may adsorb the second electrode 1122 and may then transfer the second electrode 1122 to stably place the second electrode 1122 on the other surface 1223 of the upper separator sheet 1221 to which the adhesive has been applied. As a result, a second stack 22 may be formed in which the lower separator sheet 1211, the first electrode 1112, the upper separator sheet 1221, and the second electrode 1122 are sequentially stacked. The second stack 22 may be formed by stacking a plurality of second electrodes 1122 on the separator sheets 1211 and 1221 while being spaced apart from each other in a row in the longitudinal direction of the separator sheets 1211 and 1221 and disposed. Since the first electrode 1112 and the second electrode 1122 have different sizes, spacings may be different. However, it is desirable that the first electrode 1112 and the second electrode 1122 are all aligned and disposed so that centers thereof coincide.

A plurality of second nip rolls 162 may be formed and disposed on opposite surfaces of the second stack 22, respectively. In addition, the second nip roll 162 may apply pressure to the second stack 22 while rotating. Accordingly, the inside of the second stack 22 may be adhered more strongly.

The method of preparing a unit cell according to the embodiment of the present invention may be performed as follows, using the apparatus 1 for preparing a unit cell as described above.

As illustrated in FIG. 2, the lower separator sheet 1211 is first unwound from the lower separator reel 121 and is transferred from one side of the apparatus 1 for preparing a unit cell to the other side thereof. Then, the first nozzle 131 is disposed above the lower separator sheet 1211 to apply an adhesive to at least a portion of the one surface 1212 facing upward of the lower separator sheet 1211 (S101). The first electrode 1112 prepared in a separate process of preparing the electrode 11 is supplied to the first electrode table 31 or first electrode magazine (not shown) provided on one side of the apparatus 1 for preparing a unit cell. In addition, the first header 141 may adsorb the first electrode 1112 and may then transfer the first electrode 1112 to stably place the first electrode 1112 on the one surface 1212 of the lower separator sheet 1211 to which the adhesive has been applied (S102).

The upper separator sheet 1221 is unwound from the upper separator reel 122 and may be transferred from upper side to lower side. Then, the guide roll 15 guides the one surface 1222 of the upper separator sheet 1221 to face upward. Particularly, the guide roll 15 may change the transfer direction of the upper separator sheet 1221 so that the transfer direction of the upper separator sheet 1221 is opposite to that of the lower separator sheet 1211. Then, the second nozzle 132 is disposed above the upper separator sheet 1221 to apply an adhesive to at least a portion of the one surface 1222 facing upward of the upper separator sheet 1221 (S103).

The first nip roll 161 turns the opposite surfaces of the upper separator sheet 1221 upside down so that the one surface 1222 of the upper separator sheet 1221 to which the adhesive has been applied faces downward (S104). As a result, the one surface 1222 of the upper separator sheet 1221 adheres to the upper surface of the first electrode 1112 stably placed below the upper separator sheet 1221. In this case, the first nip roll 161 reverses the transfer direction of the upper separator sheet 1221 again so that the transfer direction of the upper separator sheet 1221 may be the same as that of the lower separator sheet 1211. At the same time, the first nip rolls 161 are disposed on opposite surfaces of the first stack 21, in which the lower separator sheet 1211, the first electrode 1112, and the upper separator sheet 1221 are sequentially stacked, respectively, and may apply pressure to the first stack 21 while rotating.

The third nozzle 133 is disposed above the upper separator sheet 1221 with opposite surfaces turned upside down, and applies an adhesive to at least a portion of the other surface 1223 facing upward of the upper separator sheet 1221 (S105). The second electrode 1122 prepared in a separate process of preparing the electrode 11 is supplied to the second electrode table 32 or second electrode magazine (not shown) provided on one side of the apparatus 1 for preparing a unit cell. In addition, the second header 142 may adsorb the second electrode 1122 and may then transfer the second electrode 1122 to stably place the second electrode 1122 on the other surface 1223 of the upper separator sheet 1221 to which the adhesive has been applied (S106).

The second nip rolls 162 are disposed on opposite surfaces of the second stack 22, in which the lower separator sheet 1211, the first electrode 1112, the upper separator sheet 1221, and the second electrode 1122 are sequentially stacked, respectively, and may apply pressure to the second stack 22 while rotating. In addition, a unit cell 2 may be prepared by cutting the second stack 22 at a predetermined interval by a cutter 17.

Figure 3:
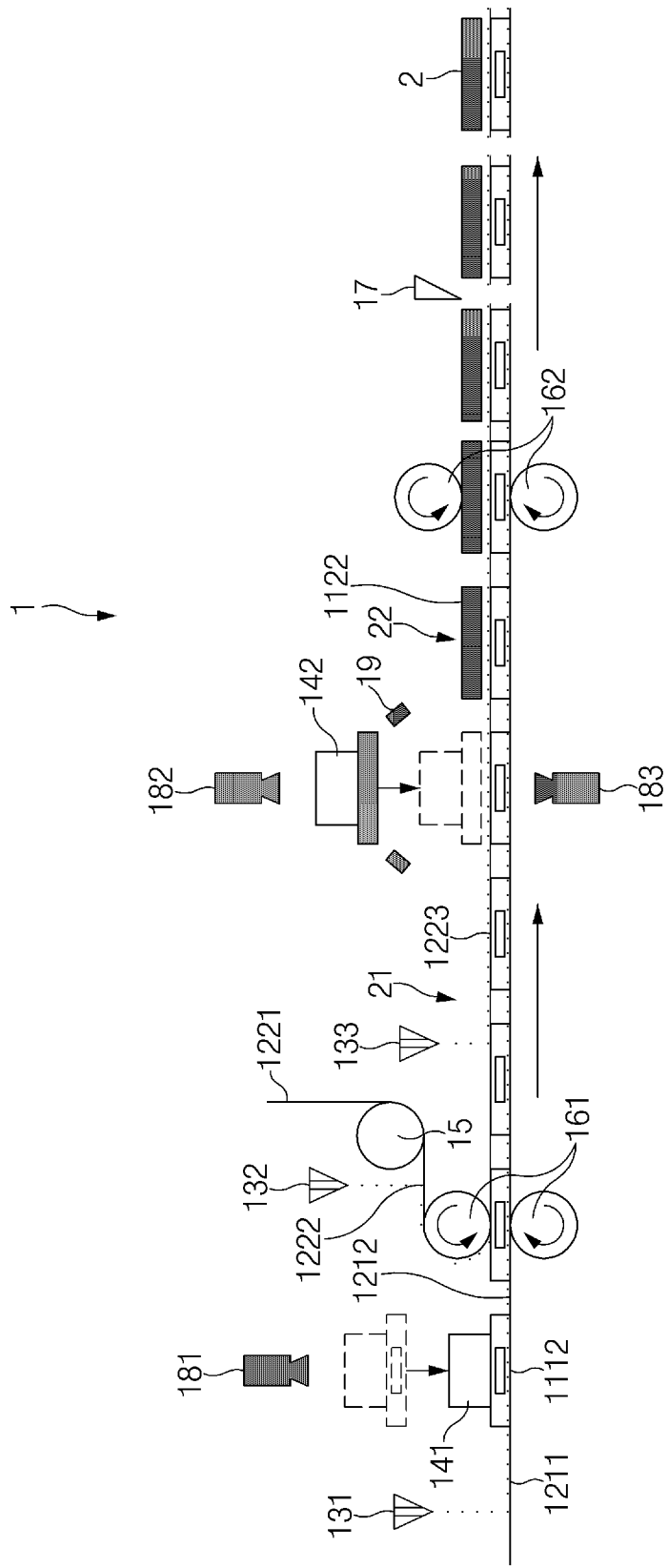
FIG. 3 is a schematic side view illustrating in detail the apparatus for preparing a unit cell according to the embodiment of the present invention.
Figure 4:
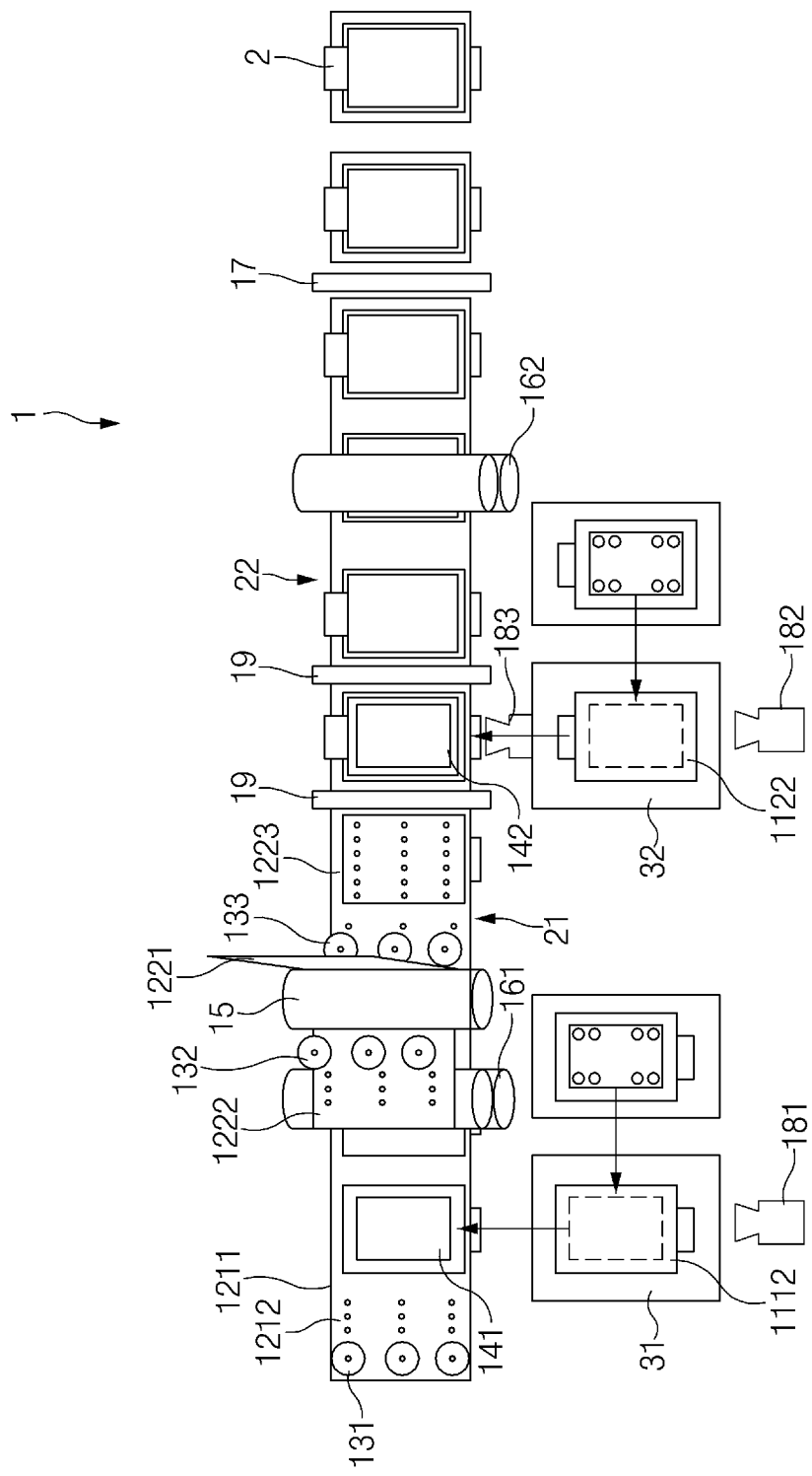
FIG. 4 is a schematic plan view illustrating in detail the apparatus for preparing a unit cell according to the embodiment of the present invention.

FIG. 3 is a schematic side view illustrating in detail the apparatus 1 for preparing a unit cell according to the embodiment of the present invention, and FIG. 4 is a schematic plan view illustrating in detail the apparatus 1 for preparing a unit cell according to the embodiment of the present invention.

As illustrated in FIGS. 3 and 4, the apparatus 1 for preparing a unit cell according to the embodiment of the present invention further includes a first vision sensor 181 disposed above the first electrode 1112 to photograph the first electrode 1112 before the first electrode 1112 adheres to the upper separator sheet 1221; a second vision sensor 182 disposed above the second electrode 1122 to photograph the second electrode 1122 before the second electrode 1122 is stably placed on the other surface 1223 of the upper separator sheet 1221; and a third vision sensor 183 disposed on a side of the first electrode 1112 to photograph the first electrode 1112 when the first electrode 1112 adheres to the upper separator sheet 1221.

The first, second, and third vision sensors 181, 182, and 183 acquire an image by photographing a specific region and receiving an image signal for the specific region. For this purpose, a vision sensor generally includes an imaging device such as a charge coupled device (CCD) or a complementary metal-oxide semiconductor (CMOS). Particularly, the first, second, and third vision sensors 181, 182, and 183 according to an embodiment of the present invention may acquire images by photographing the first electrode 1112 before adhering to the upper separator sheet 1221, the second electrode 1122, and the first electrode 1112 after adhering to the upper separator sheet 1221, respectively.

Although not shown in the drawings, the apparatus 1 for preparing a unit cell may further include a controller (not shown) which may determine whether the first electrode 1112 and the second electrode 1122 are defective or not through the images of the first electrode 1112 and the second electrode 1122. The controller may determine whether sizes, shapes, and positions of the first electrode 1112 and the second electrode 1122 are defective or damaged or not by comparing the obtained images with previously stored images of the first electrode 1112 and the second electrode 1122 of a good product.

The first vision sensor 181 is disposed above the first electrode 1112 to photograph the first electrode 1112 before the first electrode 1112 adheres to the upper separator sheet 1221. The first vision sensor 181 may be disposed above the first electrode table 31 to photograph the first electrode 1112 waiting on the first electrode table 31 before the first electrode 1112 is adsorbed on the first header 141. Accordingly, it is possible to easily determine whether or not the first electrode 1112 is defective, and, if the first electrode 1112 is defective, it may be removed before being stably placed on the lower separator sheet 1211. However, the present invention is not limited thereto, and the first vision sensor 181 may also be disposed above the lower separator sheet 1211 to photograph the first electrode 1112 stably placed on the lower separator sheet 1211.

The second vision sensor 182 is disposed above the second electrode 1122 to photograph the second electrode 1122 before the second electrode 1122 is stably placed on the other surface 1223 of the upper separator sheet 1221. The second vision sensor 182 may be disposed above the second electrode table 32 to photograph the second electrode 1122 waiting on the second electrode table 32 before the second electrode 1122 is adsorbed on the second header 142. Accordingly, it is possible to easily determine whether or not the second electrode 1122 is defective, and, if the second electrode 1122 is defective, it may be removed before being stably placed on the upper separator sheet 1221. However, the present invention is not limited thereto, and the second vision sensor 182 may also be disposed above the upper separator sheet 1221 to photograph the second electrode 1122 stably placed on the upper separator sheet 1221.

The third vision sensor 183 is disposed on the side of the first electrode 1112 to photograph the first electrode 1112 when the first electrode 1112 adheres to the upper separator sheet 1221. The third vision sensor 183 may photograph the first electrode 1112 after the second electrode 1122 is stably placed on the upper separator sheet 1221. Accordingly, it is possible to easily determine whether or not the first electrode 1112 is defective even if the first electrode 1112 is damaged or the first electrode 1112 is out of position in a process of stably placing the second electrode 1122 on the upper separator sheet 1221.

When the first electrode 1112 adheres to the upper separator sheet 1221, opposite surfaces of the first electrode 1112 adhere to the upper separator sheet 1221 and the lower separator sheet 1211 to be covered therewith. Then, even if the third vision sensor 183 photographs the first electrode 1112, a clear image may not be obtained. Thus, as illustrated in FIGS. 3 and 4, a separate light source 19 may be disposed above the upper separator sheet 1221. When the first electrode 1112 adheres to the upper separator sheet 1221, the light source 19 may radiate light toward the upper separator sheet 1221, particularly a region photographed by the third vision sensor 183. As a result, the third vision sensor 183 may obtain a clearer image.

If the apparatus 1 for preparing a unit cell according to the embodiment of the present invention is used, when the electrode 11 and the separator sheets 1211 and 1221 are stacked to prepare the unit cell 2, a displacement in position of the electrode 11 may be prevented by applying the adhesive in advance whenever the electrode 11 is stably placed on the separator sheets 1211 and 1221, even if an expensive separator is not used. Also, since there is no need to perform a laminating process, a laminator may be removed, and thus, a volume of the apparatus 1 for preparing a unit cell may be reduced and a preparation process may be simplified.

Figure 5:
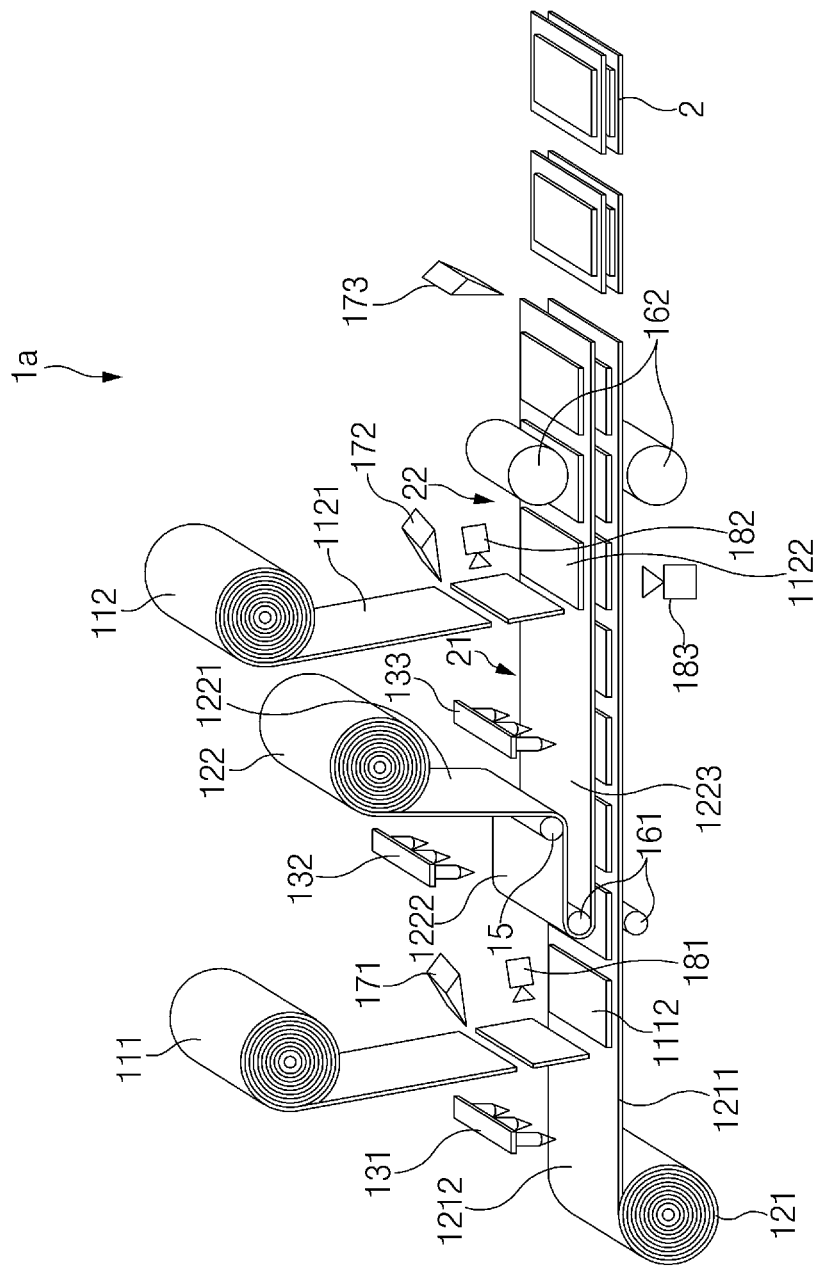
FIG. 5 is a schematic view of an apparatus for preparing a unit cell according to another embodiment of the present invention.

FIG. 5 is a schematic view of an apparatus 1a for preparing a unit cell according to another embodiment of the present invention.

According to an embodiment of the present invention, the first electrode 1112 and the second electrode 1122 are prepared in a separate process of preparing the electrode 11 and then supplied. However, the apparatus 1a for preparing a unit cell according to the another embodiment of the present invention further includes a first electrode reel 111 from which a first electrode sheet 1111, which is to be the first electrode 1112, is unwound and a second electrode reel 112 from which a second electrode sheet 1121, which is to be the second electrode 1122, is unwound. That is, the first electrode 1112 and the second electrode 1122 may be prepared immediately by cutting the first electrode sheet 1111 and the second electrode sheet 1121 in the apparatus 1a for preparing a unit cell.

The first electrode reel 111 is a reel on which the first electrode sheet 1111 is wound, and the first electrode sheet 1111 is unwound from the first electrode reel 111. In addition, the second electrode reel 112 is a reel on which the second electrode sheet 1121 is wound, and the second electrode sheet 1121 is unwound from the second electrode reel 112. The first electrode sheet 1111 is cut to form a plurality of first electrodes 1112, and the second electrode sheet 1121 is cut to form a plurality of second electrodes 1122.

Figure 6:
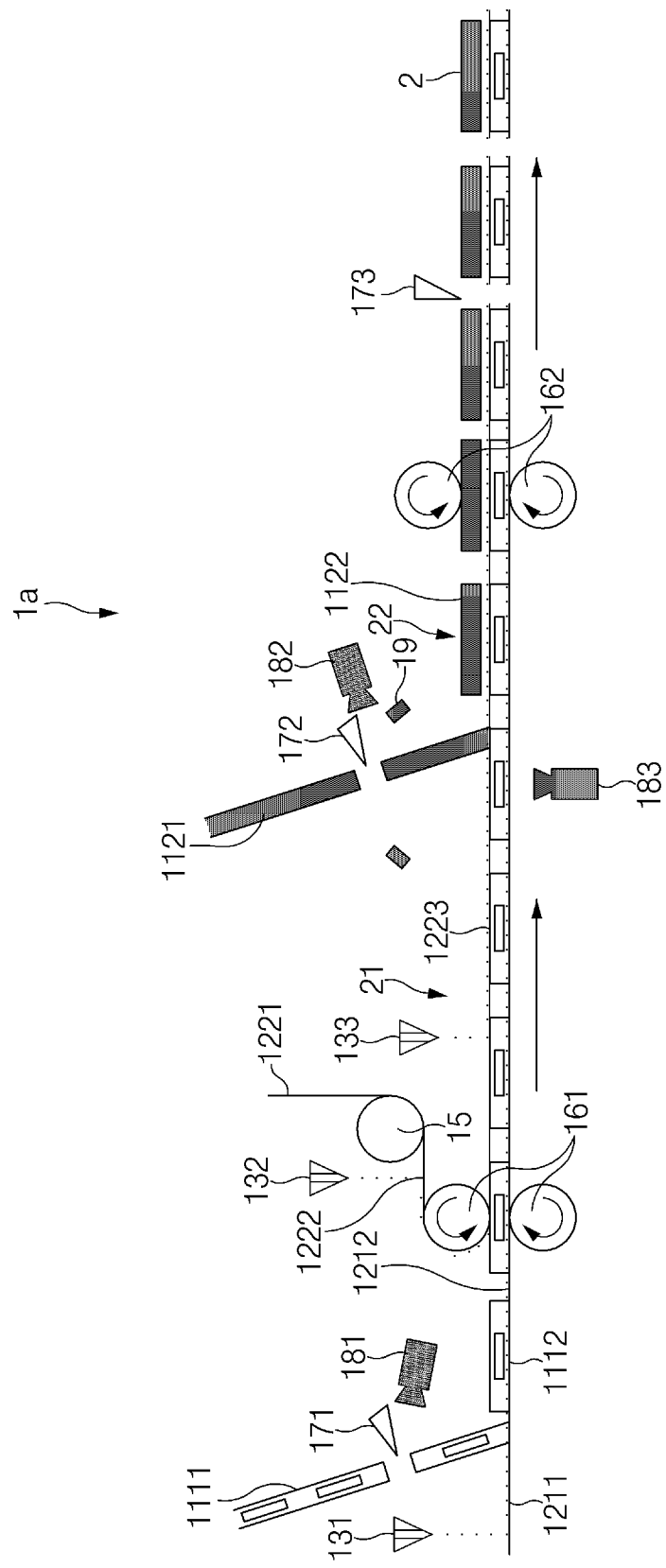
FIG. 6 is a schematic side view illustrating in detail the apparatus for preparing a unit cell according to the another embodiment of the present invention.

FIG. 6 is a schematic side view illustrating in detail the apparatus 1a for preparing a unit cell according to the another embodiment of the present invention.

According to another embodiment of the present invention, as illustrated in FIG. 6, the first vision sensor 181 is disposed above the first electrode 1112 to photograph the first electrode 1112 before the first electrode 1112 adheres to the upper separator sheet 1221. When a first cutter 171 cuts the first electrode sheet 1111 to form the first electrode 1112, the first vision sensor 181 may photograph the first electrode 1112 before the first electrode 1112 is stably placed on the one surface 1212 of the lower separator sheet 1211. When a second cutter 172 cuts the second electrode sheet 1121 to form the second electrode 1122, the second vision sensor 182 may photograph the second electrode 1122 before the second electrode 1122 is stably placed on the other surface 1223 of the upper separator sheet 1221. When the first electrode 1112 adheres to the upper separator sheet 1221, the third vision sensor 183 is disposed on a side of the first electrode 1112 to photograph the first electrode 1112. Thus, it is possible to determine whether sizes, shapes, and positions of the first electrode 1112 and the second electrode 1122 are defective or damaged or not.

A method of preparing a unit cell according to another embodiment of the present invention may be performed as follows, using the apparatus 1a for preparing a unit cell as described above.

When the first nozzle 131 applies an adhesive to at least a portion of the one surface 1212 facing upward of the lower separator sheet 1211 (S101), the first cutter 171 cuts the first electrode sheet 1111 unwound from the first electrode reel 111 to form the first electrode 1112. The first electrode 1112 may be immediately stably placed on the one surface 1212 of the lower separator sheet 1211 (S102). When the second nozzle 132 applies an adhesive to at least a portion of the one surface 1222 facing upward of the upper separator sheet 1221 (S103), the first nip roll 161 turns opposite surfaces of the upper separator sheet 1221 upside down (S104). Thereafter, when the third nozzle 133 applies an adhesive to at least a portion of the other surface 1223 facing upward of the upper separator sheet 1221 with opposite surfaces turned upside down (S105), the second cutter 172 cuts the second electrode sheet 1121 unwound from the second electrode reel 112 to form the second electrode 1122. The second electrode 1122 may be immediately stably placed on the other surface 1223 of the upper separator sheet 1221 (S106). The unit cell 2 may be prepared by cutting the thus-formed second stack 22 at a predetermined interval with the third cutter 173.

It will be understood by those of ordinary skill in the art that various changes in form and details may be made therein without departing from the spirit and scope of the invention as defined by the following claims. Accordingly, it is to be understood that the invention has been described by way of illustration and not limitation. Thus, the scope of the invention is defined by the following claims rather than the foregoing detailed description, and it is to be interpreted that all changes or modifications derived from the meaning, scope and equivalent concept of the appended claims are within the scope of the present invention.

DESCRIPTION OF THE REFERENCE NUMERALS

| | |
|---|---|
| 1: Unit Cell Preparation Apparatus | 2: Unit Cell |
| 11: Electrode | 13: Nozzle |
| 15: Guide Roll | 17: Cutter |
| 19: Light Source | 21: First Stack |
| 22: Second Stack | 31: First Electrode Table |
| 32: Second Electrode Table | 111: First Electrode Reel |
| 112: Second Electrode Reel | 121: Lower Separator Reel |
| 122: Upper Separator Reel | 131: First Nozzle |
| 132: Second Nozzle | 133: Third Nozzle |
| 141: First Header | 142: Second Header |
| 161: First Nip Roll | 162: Second Nip Roll |
| 171: First Cutter | 172: Second Cutter |
| 173: Third Cutter | 181: First Vision Sensor |
| 182: Second Vision Sensor | 183: Third Vision Sensor |
| 1111: First Electrode Sheet | 1112: First Electrode |
| 1121: Second Electrode Sheet | 1122: Second Electrode |
| 1211: Lower Separator Sheet | 1212: One Surface of the Lower Separator Sheet |
| 1221: Upper Separator Sheet | 1222: One Surface of the Upper Separator Sheet |
| 1223: The Other Surface of the Upper Separator Sheet | |

The invention claimed is:

1. An apparatus for preparing a unit cell, the apparatus comprising:
    a lower separator reel from which a lower separator sheet is unwound;
    a first nozzle configured to apply an adhesive to at least a portion of one surface facing upward of the unwound lower separator sheet;
    an upper separator reel from which an upper separator sheet is unwound;
    a guide roll configured to guide one surface of the upper separator sheet to face upward when the upper separator sheet is unwound and transferred to make a transfer direction of the upper separator sheet opposite to a transfer direction of the lower separator sheet;
    a second nozzle configured to apply an adhesive to at least a portion of one surface facing upward of the unwound upper separator sheet; and
    a first nip roll configured to reverse the transfer direction of the upper separator sheet while turning opposite surfaces of the upper separator sheet upside down so that the one surface of the upper separator sheet to which the adhesive has been applied is directed downward and adheres to an upper surface of a first electrode stably placed on the one surface of the lower separator sheet.

2. The apparatus for preparing the unit cell of claim 1, further comprising:
    a first header configured to stably place the first electrode on the one surface of the lower separator sheet to which the adhesive has been applied.

3. The apparatus for preparing the unit cell of claim 1, further comprising:
    a first electrode reel from which a first electrode sheet is unwound, wherein the first electrode sheet is configured to form the first electrode.

4. The apparatus for preparing the unit cell of claim 1, further comprising:
    a first vision sensor disposed above the first electrode configured to photograph the first electrode, before the first electrode adheres to the upper separator sheet.

5. The apparatus for preparing the unit cell of claim 1, wherein the first nip roll includes two first nip rolls respectively disposed on opposite surfaces of a first stack, the two first nip rolls configured to apply pressure to the first stack while rotating, wherein the first stack includes the lower separator sheet, the first electrode, and the upper separator sheet stacking sequentially stacked.

6. The apparatus for preparing the unit cell of claim 1, further comprising:
    a third nozzle configured to apply an adhesive to at least a portion of the other surface facing upward of the upper separator sheet.

7. The apparatus for preparing the unit cell of claim 6, further comprising:
    second nip rolls respectively disposed on opposite surfaces of a second stack the second nip rolls configured to apply pressure to the second stack while rotating, when the second electrode is stably placed on the other surface of the upper separator sheet to which the adhesive has been applied, wherein the second stack includes the lower separator sheet, the first electrode, the upper separator sheet and a second electrode sequentially stacked.

8. The apparatus for preparing the unit cell of claim 7, further comprising:
    a second header configured to stably place the second electrode on the other surface of the upper separator sheet to which the adhesive has been applied.

9. The apparatus for preparing the unit cell of claim 7, further comprising:
    a second electrode reel from which a second electrode sheet is unwound, wherein the second electrode sheet is configured to form the second electrode.

10. The apparatus for preparing the unit cell of claim 7, further comprising:
    a second vision sensor disposed above the second electrode configured to photograph the second electrode, before the second electrode is stably placed on the other surface of the upper separator sheet.

11. The apparatus for preparing the unit cell of claim 7, further comprising a cutter configured to cut the second stack at a predetermined interval.

12. The apparatus for preparing the unit cell of claim 1, further comprising:
- a third vision sensor disposed on a side of the first electrode configured to photograph the first electrode, when the first electrode adheres to the upper separator sheet.

13. The apparatus for preparing the unit cell of claim 12, further comprising:
- a light source disposed above the upper separator sheet configured to radiate light toward the upper separator sheet, when the first electrode adheres to the upper separator sheet.

14. The apparatus for preparing the unit cell of claim 1, wherein the one surface of the upper separator sheet to which the adhesive is applied is configured to come into contact with the upper surface of the first electrode immediately upon the upper separator sheet being turned upside down.

15. A method of preparing a unit cell, the method comprising:
- unwinding a lower separator sheet from a lower separator reel;
- applying an adhesive by a first nozzle to at least a portion of one surface facing upward of the unwound lower separator sheet;
- stably placing a first electrode on the one surface of the lower separator sheet to which the adhesive has been applied;
- unwinding an upper separator sheet from an upper separator reel;
- guiding one surface of the upper separator sheet to face upward by a guide roll when the upper separator sheet is unwound and transferred to make a transfer direction of the upper separator sheet opposite to a transfer direction of the lower separator sheet;
- applying an adhesive by a second nozzle to at least a portion of one surface facing upward of the unwound upper separator sheet; and
- reversing the transfer direction of the upper separator sheet while turning opposite surfaces of the upper separator sheet upside down by first nip rolls so that the one surface of the upper separator sheet to which the adhesive has been applied is directed downward and adheres to an upper surface of the first electrode stably placed on the one surface of the lower separator sheet.

16. The method of claim 15, wherein the turning of the opposite surfaces of the upper separator sheet upside down comprises the first nip rolls respectively disposed on opposite surfaces of a first stack, the first nip rolls configured to apply pressure to the first stack while rotating, wherein the first stack includes the lower separator sheet, the first electrode, and the upper separator sheet sequentially stacked.

17. The method of claim 15, further comprising:
applying an adhesive by a third nozzle to at least a portion of the other surface facing upward of the upper separator sheet, after the turning of the opposite surfaces of the upper separator sheet upside down.

18. The method of claim 17, further comprising:
stably placing a second electrode on the other surface of the upper separator sheet to which the adhesive has been applied, after the applying of the adhesive by the third nozzle.

19. The method of claim 18, further comprising:
respectively disposing second nip rolls on opposite surfaces of a second stack, the second nip rolls configured to apply pressure to the second stack while rotating, after the stably placing of the second electrode, wherein the second stack includes the lower separator sheet, the first electrode, the upper separator sheet, and the second electrode sequentially stacked.

20. The method of claim 19, further comprising:
cutting the second stack at a predetermined interval by a cutter, after the applying of the pressure to the second stack.

* * * * *